April 18, 1933. J. R. POWELL 1,904,879
LENS CUTTING MACHINE
Filed Feb. 21, 1930  2 Sheets-Sheet 1

John R. Powell
*INVENTOR*

BY *G. A. Ellestad*
*ATTORNEY*

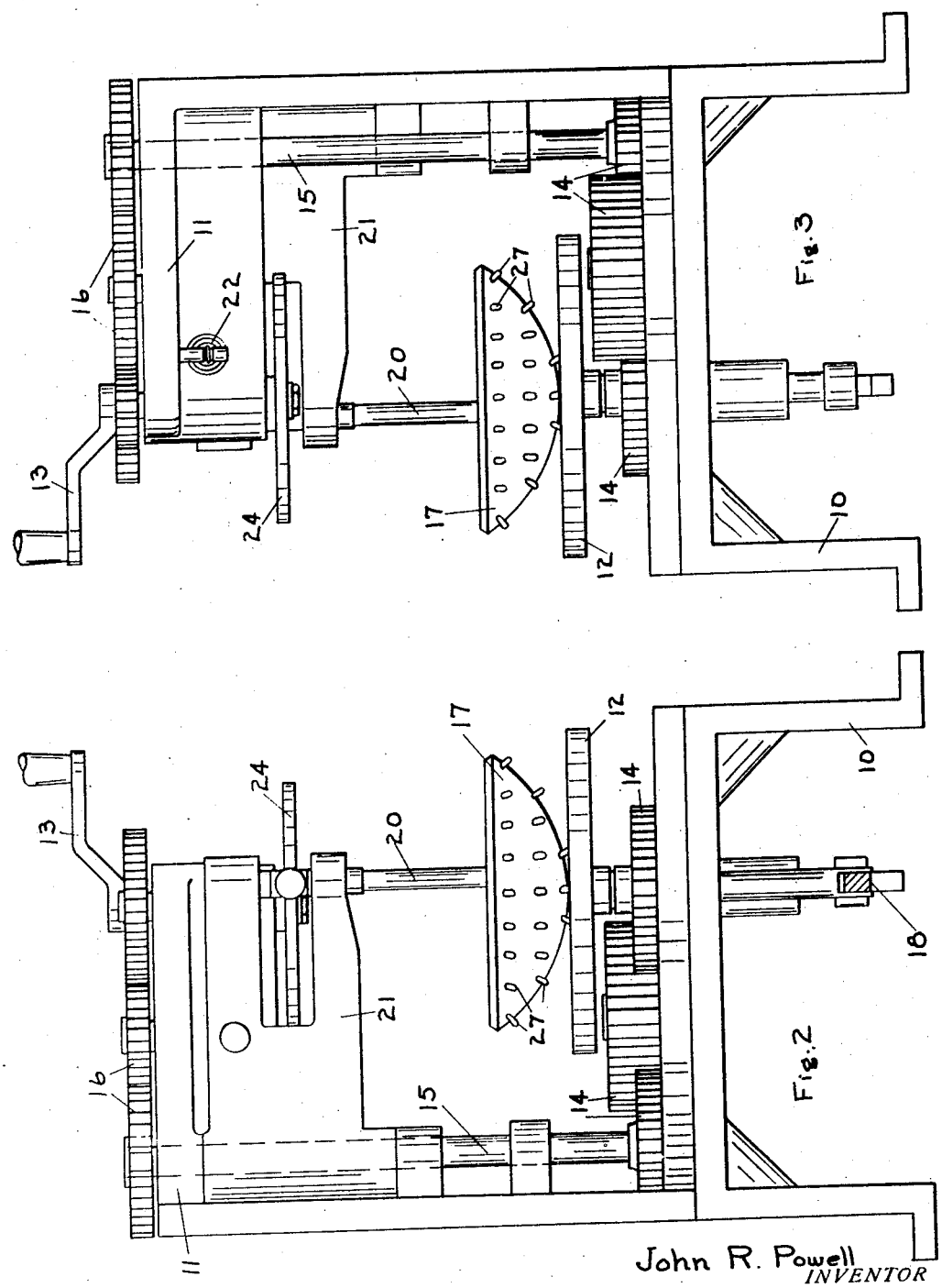

Patented Apr. 18, 1933

1,904,879

UNITED STATES PATENT OFFICE

JOHN R. POWELL, OF ROCHESTER, NEW YORK, ASSIGNOR TO BAUSCH & LOMB OPTICAL COMPANY, OF ROCHESTER, NEW YORK, A CORPORATION OF NEW YORK

LENS CUTTING MACHINE

Application filed February 21, 1930. Serial No. 430,248.

This invention relates to glass cutting machines and more particularly it has reference to a machine which is adapted to cut spectacle and goggle lenses or other curved glass articles.

It is well known that in cutting glass the most efficient results are obtained when the cutting edge or point of the cutter, such as a diamond, for example, is substantially perpendicular to the surface of the glass which is being cut. It is therefore desirable and necessary to provide suitable means to maintain the proper relationship between the cutter and the surface of the glass when cutting spectacle or goggle lenses which are of the meniscus or deeply curved type.

One of the objects of this invention is to provide an efficient device for cutting spectacle and goggle lenses. Another object is to provide means of the character described whereby the surface of the work to be operated upon may be positioned substantially perpendicular to the cutting tool. Still another object is to provide an improved lens support for a lens cutting machine whereby portions of the surface of a curved lens may be positioned so that the cutting tool will be substantially perpendicular thereto. These and other objects and advantages reside in certain novel features of construction, arrangement and combination of parts as will hereinafter be more fully explained and pointed out in the appended claims.

Referring to the drawings:

Fig. 2 is a side elevation as seen from the left of Fig. 1.

Fig. 3 is a side elevation as seen from the right of Fig. 1.

Figure 1:
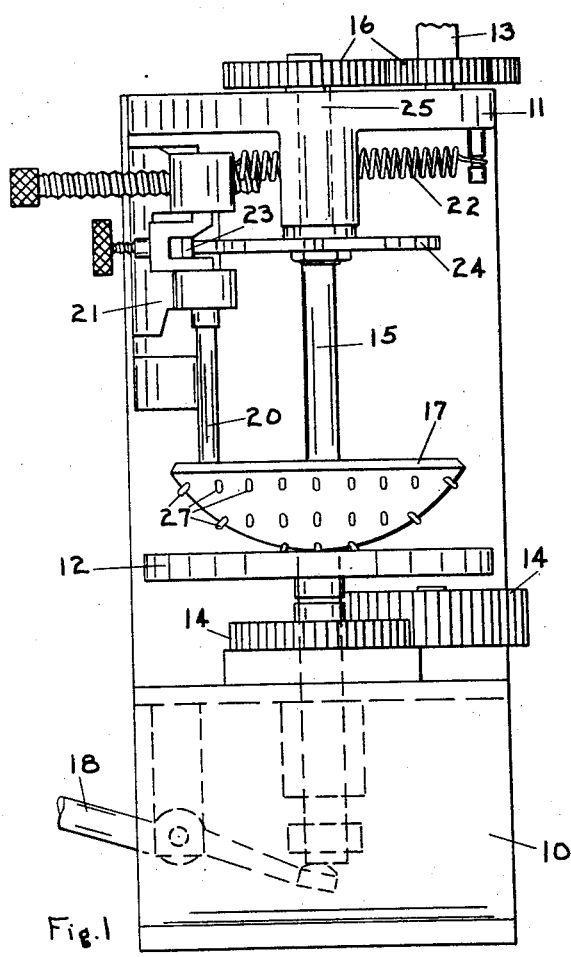
Fig. 1 shows a front view of a lens cutting machine embodying my invention.
Figure 4:
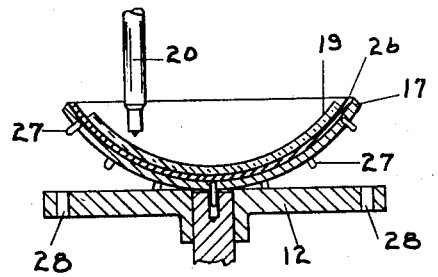
Fig. 4 is a sectional view showing the normal position of the lens support and cutter.

A preferred embodiment of my invention is shown in the drawings wherein 10 indicates a supporting table carrying the support 11. Rotatably mounted on table 10 is the plate 12 which is rotated by the crank 13 through the connecting gears 14, shaft 15 and gears 16. The rotatable plate 12 carrying the lens support 17, to be hereinafter described, may be raised vertically by means of the pivotally mounted lever 18 to bring the lens 19 into operating contact with the cutting tool 20.

The cutting tool 20 is carried by the bracket 21 which is swingably mounted on the support 11. A coil spring 22 attached to bracket 21 tends to pull the bracket to one side so that the contact member 23 on the bracket 21 yieldably engages the periphery of the form-plate 24. The form-plate 24 is mounted, coaxially with the plate 12, on the stub shaft 25 which may be rotated by one of the gears 16 so that the shape of the form-plate 24 will determine the contour or outline of the lens which is cut, as will be apparent to one skilled in the art.

The lens support 17, shown in the drawings, comprises a spherical shell having an outer convex surface and an inner concave surface. A lining 26 such as sheet rubber, for example, may be attached to the inner surface so as to provide a suitable non-slipping engagement with the lens 19 which is supported thereon. Secured to the outer surface of support 17 are a number of spaced, outwardly projecting pins 27 which are adapted to enter and cooperate with the correspondingly spaced openings 28 in plate 12 when the support 17 rolls upon the surface of plate 12 during operation of the cutting machine.

Figure 5:
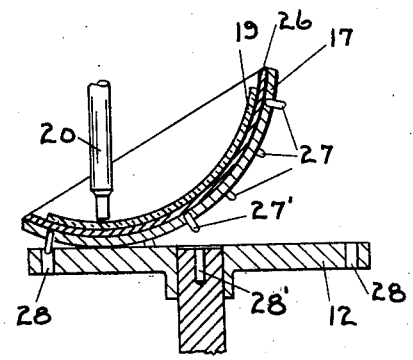
Fig. 5 is a similar view showing the position of the support and cutter in operation.

In operation, a lens 19 is placed on the lining 26 on the inner surface of support 17, which normally rests on the plate 12, as shown in Figs. 1 to 4, with the central pin 27' projecting freely into the central opening 28' in plate 12. By means of the pivoted lever 18 the plate 12 is raised vertically to bring the lens 19 into contact with cutting tool 20 which is held against vertical movement. Since the support 17 is free to move in vertical planes, it and the lens 19 will be gradually tilted until they reach the position shown in Fig. 5 when the cutting tool 20 will be substantially perpendicular to the portion of the lens surface which is directly beneath it. By means of crank 13 the table 12 and lens support 17 can be rotated so as to cut the lens, the contour or outline of the cut lens being determined by the contour of the forming-plate 24. As the support 17 rolls and tilts freely on the plate 12, some of the pins 27 are always in cooperation with the corresponding openings 28 so that the support 17 is always in driving engagement with the plate 12.

Figure 8:
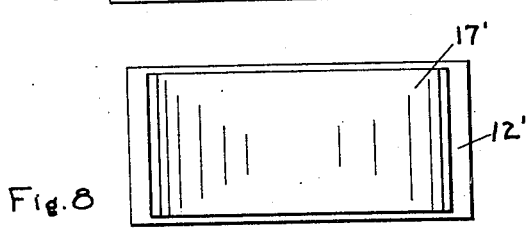
Fig. 8 shows a top plan view of same.
Figure 6:
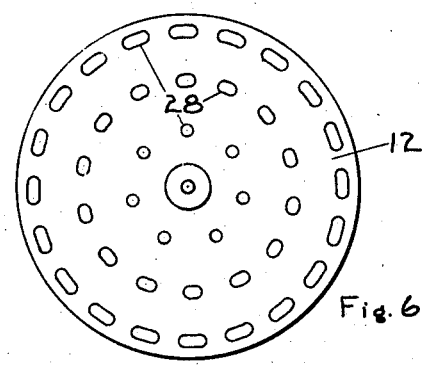
Fig. 6 is a top plan view of the plate which carries the lens support.
Figure 7:
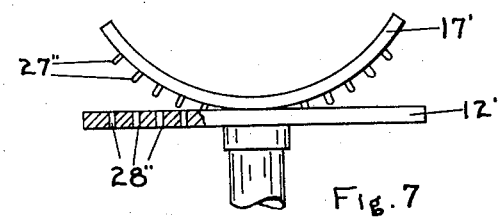
Fig. 7 shows a side view, partly in section, of a modified lens support.

A modified form of lens support adapted to support cylindrical lenses is shown in Figs. 7 and 8. Instead of being spherical the support is cylindrical as clearly shown in the figures. The cylindrical lens support 17', resting on the rotatable plate 12', is provided with a series of spaced, outwardly projecting pins 27" which cooperate with the openings 28" in the plate 12'. It will be apparent that, in operation, the support 17' will tilt and roll upon the surface of plate 12' so as to keep the cutting tool substantially perpendicular to the surface of the lens which is being cut. The cylindrical support 17' will, of course, only be tilted or rocked in a single plane with respect to plate 12' whereas the spherical lens support 17 will be free to rock and tilt, with respect to plate 12, in a plurality of planes.

Spherical and cylindrical supports of various curvatures can obviously be provided to properly hold lenses of various curvatures. From the foregoing it will be apparent that I am able to attain the objects of my invention and provide an efficient lens cutting machine in which the lens operated upon is positioned so that the cutting tool is substantially perpendicular to the surface being cut. Various modifications can obviously be made without departing from the spirit of my invention as pointed out in the appended claims.

I claim:

1. A lens cutting machine comprising a cutting tool, a plate, a lens support on said plate, means for rotating said plate and support, said support comprising a spherical shell having an inner concave surface adapted to carry a lens and an outer convex surface positioned to roll upon said plate, and means for moving said plate and support toward said tool.

2. In a lens cutting machine, the combination of a plate, a work support carried by said plate, said support having an outer convex surface which contacts with said plate and an inner concave surface adapted to carry a lens, said convex surface being adapted to roll upon said plate whereby various portions of a surface of a lens carried by said support may be brought into a substantially parallel relationship with said plate during a cutting operation.

3. In a lens cutting machine, the combination of a vertically disposed cutting tool, a plate, a lens support carried by said plate, said support having a curved surface in contact with and adapted to roll upon said plate, said support having an inner curved surface for supporting a lens, means for relatively moving said tool and said support and means for driving said plate and said support.

4. In a lens cutting machine, the combination of a cutting tool, a movable plate, a lens support having an inner concave lens holding surface and a convex base resting on and adapted to roll upon said plate whereby said support is movable in a plurality of vertical planes, means providing a driving engagement between said plate and said support and means for relatively moving said tool and said support.

5. A lens cutting machine comprising a vertically disposed cutting tool, a plate having apertures therein, a lens support having a spherical base contacting with said plate, pins projecting outwardly from said base, said pins being adapted to cooperate with said apertures to provide a driving engagement between said plate and said support, means for driving said plate and means for relatively moving said tool and said support toward and from each other.

6. A lens cutting machine comprising a cutting tool, a rotatable member having a surface, a lens support having a surface, said surfaces being in contact, one of said surfaces being substantially flat, the other surfaces being curved whereby said surfaces are in rolling contact, means providing a driving engagement between said member and said support and means for relatively moving said tool and said support to bring said tool and a lens carried by said support into operative relation.

7. A lens cutting machine having in combination a cutting tool, a rotatable plate, a lens support having a cylindrical inner surface for holding a lens and a cylindrical outer surface resting on and adapted to roll upon said plate whereby said support is movable in a vertical plane, means providing driving engagement between said plate and said support and means for putting said tool into operative relation with a lens on said support.

8. In a lens cutting machine, the combination of a plate, a cutting tool disposed in a plane which is perpendicular to said plate, a work support carried by said plate, means for relatively moving said tool and support toward and from each other, said support having a curved base in contact with and positioned to roll upon said plate, said support having an inner curved surface for supporting a lens to be cut and means for rotating said plate and support.

9. A lens cutting machine comprising a substantially flat plate, a cutting tool, a lens support on said plate, said support having an inner concave surface for supporting a lens and an outer convex surface positioned on said plate and adapted to roll thereon, means for rotating said plate and support and means for relatively moving said support and tool toward and from each other.

10. A lens cutting machine having in combination a tool, a flat plate, a work support mounted on said plate, said support having an inner concave surface for holding a lens to be cut and an outer convex surface resting on and adapted to roll upon said plate, means for relatively moving said support and tool toward and from each other for bringing the tool into operative relation with a lens on the support and means for relatively moving the tool and support to effect a cutting operation.

11. A lens cutting machine comprising a cutting tool, a flat plate, a work support, said support having an inner concave surface for carrying a lens and an outer convex surface contacting with and adapted to roll upon said plate, said plate having apertures therein, said support having outwardly projecting pins adapted to cooperate with said apertures to provide a driving engagement between said plate and support, means for rotating said plate and support and means for relatively moving said support and tool toward and from each other.

JOHN R. POWELL.